United States Patent [19]

Takano

[11] Patent Number: 4,578,050
[45] Date of Patent: Mar. 25, 1986

[54] BELT-TYPE TORQUE CONTROL SYSTEM
[75] Inventor: Hiroshi Takano, Hyogo, Japan
[73] Assignee: Mitsuboshi Belting Ltd., Kobe, Japan
[21] Appl. No.: 731,997
[22] Filed: May 8, 1985
[51] Int. Cl.[4] ............................................ F16H 11/06
[52] U.S. Cl. ........................................ 474/17; 474/46
[58] Field of Search ................ 474/11, 12, 17, 29, 474/30, 46; 74/866, 689

[56] References Cited

U.S. PATENT DOCUMENTS

| | | | |
|---|---|---|---|
| 3,393,572 | 7/1968 | Larsson | 474/17 |
| 3,908,475 | 9/1975 | Takagi et al. | 474/12 |
| 3,954,018 | 5/1976 | O'Berto | 474/11 |
| 4,088,036 | 5/1978 | Hillman | 474/46 X |
| 4,095,479 | 6/1978 | Lundberg | 474/12 |
| 4,229,989 | 10/1980 | Tamura | 474/12 |
| 4,541,821 | 9/1985 | Sakakibara | 474/17 |

Primary Examiner—James A. Leppink
Assistant Examiner—Frank McKenzie
Attorney, Agent, or Firm—Wood, Dalton, Phillips, Mason & Rowe

[57] ABSTRACT

A belt-type torque control system wherein a power transmission belt is entrained about a pair of variable speed pulleys. One of the pulleys includes coaxially mounted pulley halves, one of which is fixed to a drive shaft and the other of which is axially and rotatively movably mounted thereto. A coil spring extends between the movably mounted coil half and a spring retainer fixed to the shaft urging the movable pulley half toward the fixed pulley half. The coil spring causes a variation in the spacing between the pulley halves as a function of the belt force applied thereto in operation of the drive. The angular displacement of the movable pulley half is sensed by a control including sensing elements associated with the movable pulley half and sensing elements associated with the fixed pulley half so as to provide a differential angle, or phase, difference signal which is used by the control for adjusting the other adjustable pulley, thereby to maintain the adjustable pulley with which the sensing means is associated within a preselected range of angular displacement between the fixed and movable pulley halves thereof.

16 Claims, 4 Drawing Figures

U.S. Patent     Mar. 25, 1986     4,578,050

BELT-TYPE TORQUE CONTROL SYSTEM

TECHNICAL FIELD

This invention relates to power transmission belt systems and in particular to torque control means for use in such systems.

BACKGROUND ART

In the transmission of power, it is often desirable to determine and control the amount of torque being developed. Numerous devices have been developed for effecting such control, including mechanical, hydraulic, disc, etc. devices. A widely used torque control system in automotive applications comprises a mechanical torque control system.

Another form of torque control system commonly utilized in automotive applications is an oil-type control system which has recently become increasingly popular.

The known torque control systems, however, are found to have disadvantages in reliability, efficiency, and stability, particularly with the known mechanical types of torque control devices. The hydraulic torque control devices have a serious deficiency in the reduced transmission efficiency caused thereby. Thus, there has been a longfelt need for an improved torque control system which, while being simple and economical of construction, would provide high reliability, minimum energy loss, stability, and high efficiency.

DISCLOSURE OF INVENTION

The present invention comprehends an improved torque control system utilized in conjunction with a power transmission belt pulley drive which has been found to solve the above discussed vexatious problem in a novel and simple manner.

The control system utilizes an electrical sensing and control means which has high accuracy and efficiency in operating suitable means for regulating a portion of the drive system to maintain the torque output of the system with a desired range.

More specifically, the invention comprehends providing a power transmission belt and pulley drive system wherein each of the pulleys comprises a variable speed pulley. One of the variable speed pulleys is utilized to provide a signal indicating an angular displacement between a first pulley half rotatably mounted on a drive shaft and a second pulley half fixedly mounted thereto, with the rotative disposition of the first pulley half being controlled by a coil spring mounted coaxially of the shaft and having one end connected to a spring retainer fixed to the shaft and an opposite end connected to the movable pulley half.

The means for sensing the angular displacement provides a signal for controlling an operator which, in turn, adjusts the other variable speed pulley so as to cause a change in the operating characteristics of the drive system such as to maintain the torque developed in the output shaft associated with the first variable speed pulley within a preselected range.

Thus, the invention comprehends provision of an electrical control system which coordinates the angular displacement of a portion of a first variable speed pulley with the effective diameter of a second variable speed pulley of the drive system to effect the desired torque control of the system.

More specifically, the invention comprehends providing in a drive system having a first variable speed pulley, a second variable speed pulley having first and second pulley halves defining axially opposite, radially inwardly converging belt groove sidewalls coaxially mounted to a shaft, means for fixedly securing one of the pulley halves to the shaft, means for rotatably axially slidably mounting the second pulley half to the shaft, and spring means associated with the spring halves for resiliently biasing the pulley halves to have a preselected minimum spacing between the belt groove sidewalls and causing an increase in the spacing between the sidewalls as a result of the second pulley half being rotatively displaced about the shaft as a result of drive forces developed between the belt and the second pulley half, a belt entrained about the pulleys to provide a driving connection therebetween, electrical means for sensing the angular displacement between the fixed first and movable send pulley halves, and adjusting means for adjusting the first pulley effectively to maintain the angular displacement within a preselected range.

In the illustrated embodiment, the electrical sensing means comprises pulse generating means which illustratively may be of the magnetic pulse generating type.

In the illustrated embodiment, the electrical sensing means comprises first pulse generating means associated with the first pulley half and second pulse generating means associated with the second pulley half of one of the variable speed pulleys, control means for sensing the angular relationship about the axis of the shaft of the pulse generating means associated with the second pulley half and the pulse generating means associated with the first pulley half.

In the illustrated embodiment, the pulse generating means comprises a plurality of elements circumferentially equiangularly spaced about the axis of the shaft.

The shaft may be either the driven output shaft of the drive system or the driver shaft of the drive system, within the scope of the invention.

In the illustrated embodiment, each of the variable speed pulleys comprises a pair of axially adjustably spaceable pulley halves.

The belt-type torque control system of the present invention is extremely simple and economical of construction, while yet providing the highly desirable advantages discussed above.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 1:
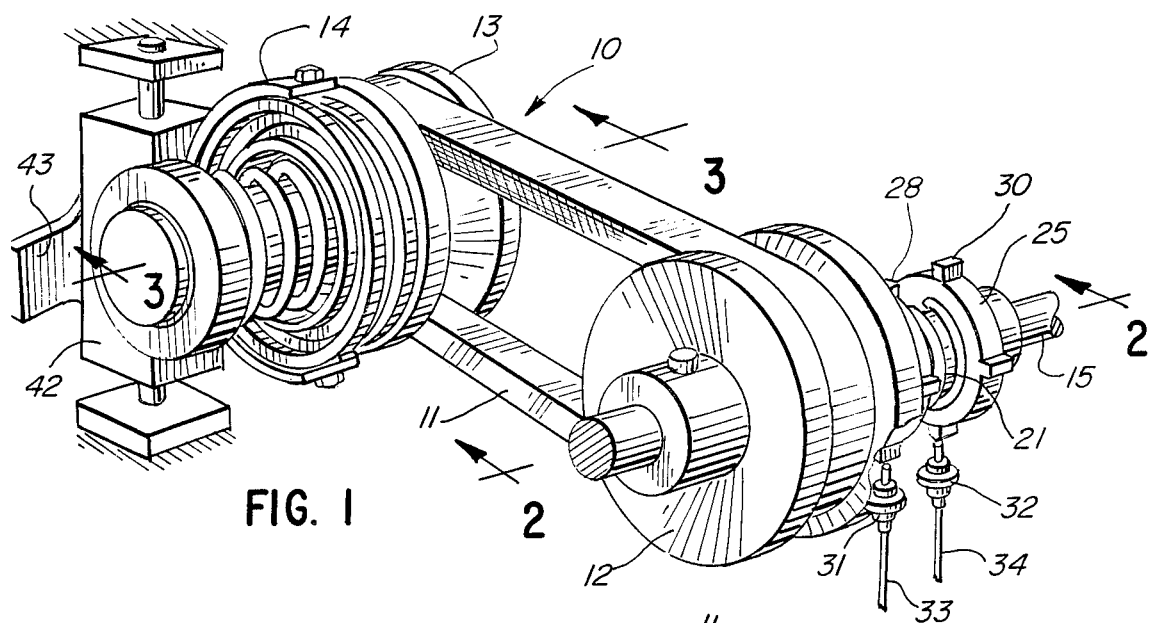
FIG. 1 is a perspective view of a belt drive system having a torque control means embodying the invention.

In the exemplary embodiment of the invention as disclosed in the drawing, a drive system generally designated 10 is shown to comprise a power transmission belt/pulley drive system including a power transmission V-belt 11, a first variable speed pulley 12 and a second variable speed pulley 13. In the illustrated embodiment, pulley 13 is associated with the input driver shaft 14 and pulley 12 is associated with the output driven shaft 15, it being understood that the invention may be utilized with the relationship of the driver and driven shafts being reversed, within the broad scope of the invention.

Figure 2:
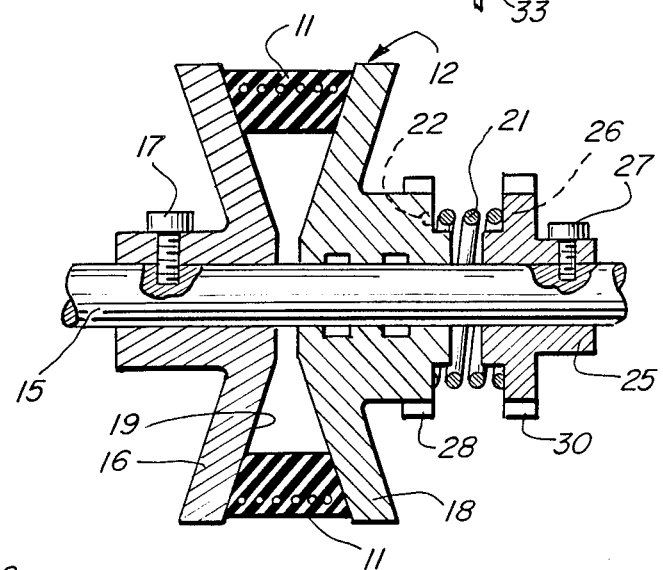
FIG. 2 is a diametric section illustrating in greater detail the driven pulley portion of the drive system, with the torque control sensing means associated therewith.

The first pulley 12, as shown in FIG. 2, includes a first pulley half 16, which is fixedly secured to the shaft 15 as by bolt 17.

Pulley 12 further includes a second pulley half 18, which is movably mounted on shaft 15 so as to be both rotatively and axially slidable thereon. The two pulley halves define confronting, radially inwardly converging belt groove sidewalls 19 and 20, respectively, cooperatively defining the pulley groove in which belt 11 is entrained in passing around the pulley, as illustrated in FIG. 1.

Movable second pulley half 18 is urged toward first pulley half 16 by a coil spring 21 having a first end 22 connected to the pulley half 18 by an abutment thereof with a shoulder 23 on the pulley half 18. The other end 24 of the spring is connected to a spring retainer 25 by abutment thereof with a shoulder 26 on the spring retainer. The spring retainer 25 is fixedly secured to shaft 15 by a bolt 27.

The shoulders 23 and 26 are arranged so that the spring tends to uncoil as a result of force being applied by the belt 11 to the groove sidewall surface 20 in the operation of the drive. As a result, the movable pulley 18 moves on the shaft relative to the pulley 16, which is fixed to the shaft by the bolt 17, both axially and radially so as to change the spacing between the belt groove sidewalls 19 and 20, thereby changing the effective diameter of the pulley by permitting the belt 11 to move radially inwardly or radially outwardly as a result of the change in the spacing.

The invention comprehends detecting the angular displacement of the movable pulley 18 relative to the fixed pulley 16 and utilizing the sensed angular displacement for controlling the adjustment of the second variable speed pulley 13 so as to change the effective diameter of the pulley 13 suitably to maintain the torque transmitted to the pulley 18 within a preselected range.

More specifically, pulley 18 is provided with a plurality of circumferentially spaced pulse generating elements 28 on a hub extension portion 29 thereof. Spring retainer 25 is provided with a similar plurality of circumferentially spaced pulse generating elements 30.

A pair of pickup devices 31 and 32 are connected through leads 33 and 34, respectively, to an amplifier control 35. In the illustrated embodiment, the elements 28 and 31 define magnetic signal pulse generating means providing a series of pulses to the control 35 as a result of the rotation of the shaft 15. The control is set so that, under a no-load condition, the pulses detected by the pickup element 32 coincide with the pulses detected by the pickup element 31. However, as discussed above, when load is applied to the movable pulley 18, the resilient spring 21 is uncoiled so as to cause a movement of the pulley 18 both rotatively and axially on the shaft 15.

The rotative displacement of the pulley 18 is sensed by the pickup 31 by determining the resultant phase difference between the pulse signals picked up by devices 31 and 32. This phase difference is amplified in the control 35 so as to provide an output signal corresponding to the angular displacement of the pulley 18.

Figure 3:
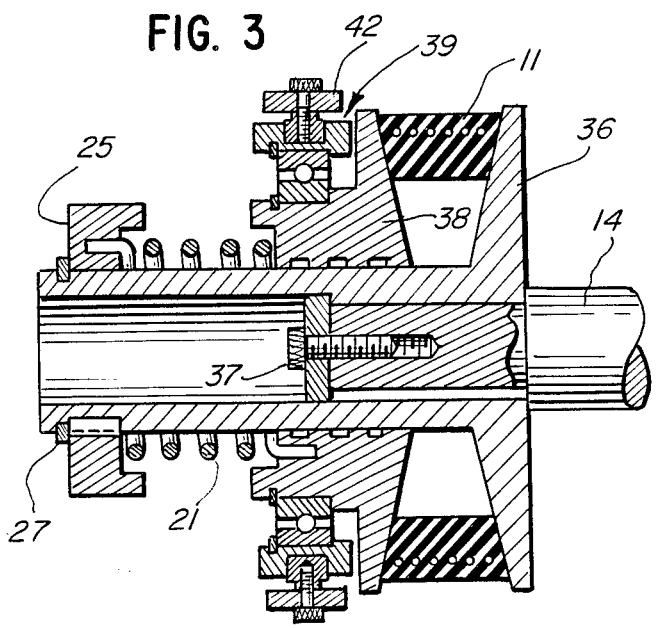
FIG. 3 is a diametric section illustrating in greater detail the drive pulley portion of the drive system, with the means for controlling the effective diameter of the pulley thereof of the control system illustrated in greater detail.
Figure 4:
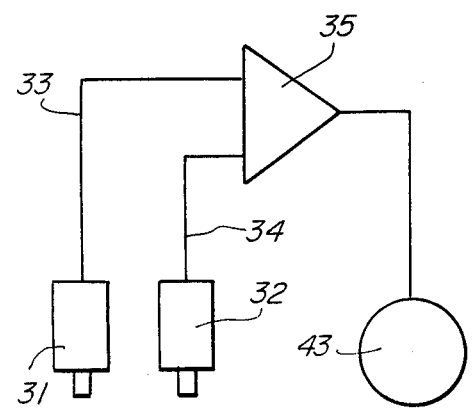
FIG. 4 is a schematic diagram of the control system.

As seen in FIG. 3, second variable speed pulley 13 is generally similar to variable speed pulley 12 including a first pulley half 36 fixedly secured to the shaft 14 by a bolt 37, and second pulley half 38 which is axially and rotatively movably mounted on the shaft 14.

The movable pulley half 38 is provided with a hub extension 39 having a circumferential radially outwardly opening groove 40. An arcuate operator element 41 is slidably received in the groove, as seen in FIG. 3. As shown, the operator extends approximately 180° and is connected to a bifurcated actuator 42.

Actuator 42 is connected to a linear motor 43 which is controlled by the output signal from the control 35 so as to adjust the axial position of the actuator and, thus, the movable pulley half 38 axially on shaft 14.

Thus, when the torque sensed by the pickup elements 31,32 exceeds a preselected value, control 35 causes an operation of motor 43 so as to urge pulley half 38 away from pulley half 36, thereby decreasing the effective diameter of the variable speed pulley 13 by permitting belt 11 to move radially toward shaft 14 between the confronting sidewalls of the pulley halves 36 and 38. Alternatively, when the torque sensed by the pickup elements 31,32 drops below a preselected lower value, control 35 operates motor 43 so as to urge the pulley half 38 toward the pulley half 36, thereby effectively increasing the diameter of the variable speed pulley 13 and increasing the torque applied to the output shaft 15 by the variable speed pulley 12.

Thus, the variable speed pulley 13 is adjusted to selectively increase or decrease the torque applied to the driven pulley 12 by the belt 11 as a function of the sensed torque developed in the output shaft exceeding or falling below a preselected range of desired output torques.

The shifting mechanism illustrated in FIG. 3 is exemplary only, it being understood that any other suitable form of mechanism for recriprocably adjusting the pulley half 38 may be utilized within the broad scope of the invention.

The shoulders 23 and 26 of the pulley half 18 and spring retainer 25 respectively, may be formed by providing recesses therein or, alternatively, by providing projections on these elements as desired within the broad scope of the invention. As indicated above, however, it is desirable that the shoulders be arranged so that the spring tends to uncoil as a result of increase in torque acting on the movable pulley 18.

The pulse generating elements 28 and 30 are illustrated as comprising projections on the pulley half 18 and spring retainer 25, respectively. As will further be understood by those skilled in the art, the pulse generating means may comprise any suitable pulse generating means whether or not projecting from these elements. Illustratively, the invention comprehends the provision of one or more magnets embedded in the respective elements for cooperation with the pickup elements 31 and 32 comprising means for sensing magnetic pulses resulting from the rotation of the shaft 15 moving the magnets seriatim past the pickup means. Further, while the invention illustrates the use of a plurality of pulse generating elements on the pulley half 18 and retainer 25, as will be obvious to those skilled in the art, a single such element may be provided on each of the elements 18 and 25.

While the invention has been described as a torque control means, as will be further obvious to those skilled in the art, the invention may be utilized in providing speed control of the output shaft wherein the adjustment of the drive pulley may be effected to maintain the speed of the output shaft 14 within a preselected range.

The foregoing disclosure of specific embodiments are illustrative of the broad inventive concepts comprehended by the invention.

I claim:

1. In a drive system having a first variable speed pulley, a second variable speed pulley having first and second pulley halves defining axially opposite radially inwardly converging belt groove sidewalls coaxially mounted to a shaft, means for fixedly securing one of the pulley halves to said shaft, means for rotatably, axially slidably mounting the second pulley half to said shaft, and spring means associated with said pulley halves for resiliently biasing said pulley halves to have a preselected minimum spacing between the belt groove sidewalls and causing an increase in the spacing between said sidewalls as a result of said second pulley half being rotatively displaced about said shaft as a result of drive forces developed between the belt and said second pulley half, and a belt entrained about said pulleys to provide a driving connection therebetween, the improvement comprising:

electrical means for sensing the angular displacement between said fixed first and movable second pulley halves; and adjusting means for adjusting said first pulley effectively to maintain said angular displacement within a preselected range.

2. The drive system of claim 1 wherein said electrical sensing means comprises first pulse generating means associated with said first pulley half, second pulse generating means associated with said second pulley half, and control means for sensing the angular relationship about the axis of said shaft of the pulse generating means associated with said second pulley half and the pulse generating means associated with said first pulley half.

3. The drive system of claim 1 wherein said electrical sensing means comprises first pulse generating means associated with said first pulley half, second pulse generating means associated with said second pulley half, and control means for sensing the angular relationship about the axis of said shaft of the pulse generating means associated with said second pulley half and the pulse generating means associated with said first pulley half, each said pulse generating means comprising a plurality of elements circumferentially equiangularly spaced about the axis of said shaft.

4. The drive system of claim 1 wherein said shaft is the driven output shaft of the drive system.

5. The drive system of claim 1 wherein said shaft is the driver shaft of the drive system.

6. The drive system of claim 1 wherein said first variable speed pulley includes a pair of coaxially mounted pulley halves defining confronting variable space belt groove sidewalls.

7. The drive system of claim 1 wherein said first variable speed pulley includes a pair of coaxially mounted pulley halves defining confronting variable space belt groove sidewalls, and said adjusting means adjusts the spacing between said sidewalls as a function of the angular displacement between the pulley halves of said second pulley sensed by said electrical means.

8. The drive system of claim 1 wherein said electrical sensing mean comprises first pulse generating means associated with said first pulley half, second pulse generating means associated with said second pulley half, and control means for sensing the angular relationship about the axis of said shaft of the pulse generating means associated with said second pulley half and the pulse generating means associated with said first pulley half, one of said pulse generating means including a plurality of pulse generating elements mounted to a pulley half.

9. The drive system of claim 1 wherein said electrical sensing means comprises first pulse generating means associated with said first pulley half, second pulse generating means associated with said second pulley half, and control means for sensing the angular relationship about the axis of said shaft of the pulse generating means associated with said second pulley half and the pulse generating means associated with said first pulley half, one of said pulse generating means including a plurality of pulse generating elements mounted to said shaft.

10. The drive system of claim 1 wherein said electrical sensing means comprises first pulse generating means associated with said first pulley half, second pulse generating means associated with said second pulley half, and control means for sensing the angular relationship about the axis of said shaft of the pulse generating means associated with said second pulley half and the pulse generating means associated with said first pulley half, said second pulse generating means including a plurality of pulse generating elements mounted to said second pulley half and said first pulse generating means including a plurality of pulse generating elements mounted to said shaft.

11. The drive system of claim 1 wherein said electrical sensing means comprises first pulse generating means associated with said first pulley half, second pulse generating means associated with said second pulley half, and control means for sensing the angular relationship about the axis of said shaft of the pulse generating means associated with said second pulley half and the pulse generating means associated with said first pulley half, said second pulse generating means including a plurality of pulse generating elements mounted to said second pulley half and said first pulse generating means including a plurality of pulse generating elements mounted to a spring retainer fixed to said shaft, and said spring means comprises a coil spring extending coaxially of said shaft between said second pulley half and said spring retainer.

12. The drive system of claim 1 wherein said spring means comprises coil spring means.

13. The drive system of claim 1 wherein said sensing means comprises magnetic pulse generating means.

14. The drive system of claim 1 wherein said sensing means comprises magnetic pulse generating means having a preselected small circumferential extent.

15. The drive system of claim 1 wherein said spring comprises a coil spring arranged to uncoil as a result of an increase in the torque developed between the first pulley and the belt.

16. A belt-type torque control system, comprising:

a first variable speed pulley including a fixed pulley half and a movable pulley half, the movable pulley half being mounted in axially and rotatably adjustable association with the fixed pulley half, a spring retainer on the fixed pulley half, a coil spring compressed between the spring retainer and said movable pulley half, said spring having ends engaged with shoulders on said movable pulley half and spring retainer;

a second variable speed pulley including a fixed pulley half and a movable pulley half;

means for positionally adjusting said movable pulley half of the second pulley relative to said fixed pulley half thereof;

a power transmission V-belt entrained about the variable speed pulleys;

a member fixed to a shaft carrying the fixed pulley half of the first pulley and having circumferentially spaced projections;

circumferentially spaced projections on the movable pulley half of said first pulley;

magnetic pickup means in proximity to said projections to sense rotation of each rotating pulley half and provide an output in the form of signal pulses; and electric control means having an amplifier, means for detecting the relative angular displacement of the movable pulley half to the fixed pulley half of the first pulley as a phase difference of said signal pulses generated by the fixed and movable pulley halves, and means for processing said signal pulse to maintain the relative angle between the fixed and movable pulley halves within a set range by adjusting the movable pulley half of said second variable speed pulley axially to change the effective diameter of the second variable speed pulley formed by the two pulley halves thereof to cause a corresponding change in the effective diameter of the first variable speed pulley.

* * * * *